US006773740B2

(12) United States Patent
Hyde et al.

(10) Patent No.: US 6,773,740 B2
(45) Date of Patent: Aug. 10, 2004

(54) METHOD FOR PREPARING CHEESE PRODUCTS AND PROCESS CHEESE BASES

(75) Inventors: Michael Anthony Hyde, Wheeling, IL (US); Lisa M. Carruthers, Wilmette, IL (US); John James McGeown, Chicago, IL (US); Gary William Trecker, Lake Zurich, IL (US)

(73) Assignee: Kraft Foods Holding, Inc., Northfield, IL (US)

( * ) Notice: Subject to any disclaimer, the term of this patent is extended or adjusted under 35 U.S.C. 154(b) by 0 days.

(21) Appl. No.: 09/737,096

(22) Filed: Dec. 12, 2000

(65) Prior Publication Data

US 2002/0071897 A1 Jun. 13, 2002

(51) Int. Cl.⁷ ............................................. A23C 19/00
(52) U.S. Cl. ........................ 426/582; 426/36; 426/39; 426/580
(58) Field of Search ............................. 426/34, 36, 39, 426/40, 519, 580, 582

(56) References Cited

U.S. PATENT DOCUMENTS

| | | | |
|---|---|---|---|
| 3,920,857 A | 11/1975 | Barker et al. ................ | 426/307 |
| 4,460,613 A | 7/1984 | Yang et al. ................. | 426/601 |
| 4,546,003 A | 10/1985 | Izzo et al. .................. | 426/581 |
| 4,762,725 A | 8/1988 | Player et al. ............... | 426/582 |
| H1165 H | 4/1993 | Horton et al. .............. | 426/555 |
| 5,215,778 A | 6/1993 | Davison et al. ............. | 426/582 |
| 5,281,432 A | 1/1994 | Zallie et al. ................ | 426/549 |
| 5,433,962 A | 7/1995 | Stipp .......................... | 426/96 |
| 5,562,937 A | 10/1996 | Senkeleski et al. .......... | 426/48 |
| 5,709,900 A | 1/1998 | Miller et al. ................ | 426/582 |
| 5,851,577 A | 12/1998 | Brenton et al. ............. | 426/582 |
| 5,882,713 A | 3/1999 | Eskins et al. ............... | 426/578 |
| 5,904,944 A | 5/1999 | Batterman et al. | |
| 6,183,804 B1 * | 2/2001 | Moran et al. ................ | 426/582 |
| 6,183,805 B1 * | 2/2001 | Moran et al. ................ | 426/582 |

FOREIGN PATENT DOCUMENTS

| | | |
|---|---|---|
| BE | 529 883 A | 12/1954 |
| EP | 0 340 857 | 11/1989 |
| EP | 0 765 608 A2 | 9/1996 |
| EP | 0 997 073 A2 | 10/1999 |
| EP | 0 997 073 A2 | 5/2000 |
| GB | 2 002 217 A | 2/1979 |
| WO | WO 99/07232 | 2/1999 |

OTHER PUBLICATIONS

Seas et al., "Development of Cheese–Flavored Dairy Spreads with Controlled Fat Content", *Magazines for Industry*, New York, vol. 9, Nov. 1, 1975, pp. 68, 70, 74.

* cited by examiner

*Primary Examiner*—Leslie Wong
(74) *Attorney, Agent, or Firm*—Fitch, Even, Tabin & Flannery

(57) ABSTRACT

The present invention provides a method for preparing cheese products, and process cheese bases for use in the production of process cheese. The method generally includes mixing one or more concentrated powders derived from milk with sodium chloride, milk fat, water, and, optionally, an edible acid and/or a preservative for a period of time sufficient to produce a well-mixed, homogeneous product, and cooling the resulting mixture for a time and at a temperature which is sufficient to allow the mixture to form a solid matrix. The solid matrix can be consumed, or can be used as a substitute for natural cheese and ground by a cheese grinding system during the production of process cheese. The present invention also provides cheese products and process cheese bases prepared according to this method, and to process cheeses produced with the process cheese bases.

17 Claims, 1 Drawing Sheet

METHOD FOR PREPARING CHEESE PRODUCTS AND PROCESS CHEESE BASES

FIELD OF THE INVENTION

The present invention relates to methods for preparing cheese products and process cheese bases for use in the production of process cheeses. This invention also relates to cheese products and process cheese bases prepared according to these methods. This invention also relates to process cheeses produced with these process cheese bases. In particular, the present invention relates to methods for preparing cheese products and process cheese bases comprising mixing one or more concentrated powders derived from milk with sodium chloride, milk fat, water, and, optionally, an edible acid and/or a preservative, and cooling the resulting mixture to allow it to form a solid matrix. The solid matrix, which has the texture and consistency of fresh cheese, can be consumed, or can be employed as a process cheese base (i.e., as a substitute for some or all of the natural cheese) during the production of process cheese.

BACKGROUND OF THE INVENTION

Natural cheese products and process cheese products, and methods for preparing these products, are well known in the food industry. Standards of Identity, which are incorporated herein by reference, have been established by the United States Food and Drug Administration for several types of process cheese products.

Process cheese is conventionally prepared by grinding, and/or mixing while heating, one or more varieties of milk fat-containing natural cheeses, such as Cheddar cheese, Colby cheese, Swiss cheese, Brick cheese, Muenster cheese, Pasta Filata cheese, washed curd and granular curd cheese. The resulting cheese is then blended with other dairy products, such as non-fat dry milk and whey solids, and with emulsifying salts, such as disodium phosphate, at temperatures which are sufficiently elevated to pasteurize the cheese, and to produce a homogeneous, pumpable, fluid cheese material that may be formed into sheets, slices, or other desired forms.

There are three general types of process cheese, which include pasteurized process cheese, pasteurized process cheese food, and pasteurized process cheese spread. These process cheeses have certain characteristics that are desirable to cheese consumers. They all have a smooth, creamy texture and a slight firmness that is attributable to the presence of at least 20 percent fat in the process cheese formulation. Based on the Standards of Identity, the main differences between the three types of process cheese are their moisture and fat content, and the use of optional components in their manufacture. These cheeses typically are made in large quantities using a horizontal cooker (sometimes called a laydown cooker) that can hold up to 500 pounds or more of cheese. Often, the process cheese is then automatically packaged in airtight cartons.

In accordance with the Standards of Identity, pasteurized process cheese is the food prepared by comminuting and mixing, with the aid of heat, one or more natural cheeses of the same or different varieties. Specifically excluded from use in the preparation of pasteurized process cheese are cream cheese, Neufchatel cheese, cottage cheese, low-fat cottage cheese, cottage cheese dry curd, cooked cheese, hard grating cheese, semisoft part-skim cheese, part-skim spice cheese, and skim milk cheese. The pasteurized process cheese is generally prepared by heating natural cheese with an emulsifying agent while mixing into a homogeneous plastic mass. During its preparation, pasteurized process cheese is generally heated for not less than about thirty seconds at a temperature of not less than about 150° F.

The moisture content of pasteurized process cheese generally cannot be more than 43 percent. However, the moisture content of pasteurized processed washed curd cheese or pasteurized processed Colby cheese cannot be more than 40 percent; the moisture content of pasteurized processed Swiss cheese or pasteurized processed Gruyere cheese cannot be more than 44 percent; and the moisture content of pasteurized processed Limburger cheese cannot be more than 51 percent.

The fat content (on a dry basis) of pasteurized process cheese cannot be less than 47 percent, except that the fat content of pasteurized processed Swiss cheese is not less than 43 percent, and the fat content of pasteurized process Gruyere cheese is not less than 45 percent. Optional ingredients for pasteurized process cheese include an edible acid, cream, water, salt, and spices.

The emulsifying agents employed in the manufacture of pasteurized process cheese are generally one or mixtures of two or more of the following: monosodium phosphate, disodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, and sodium potassium tartrate.

Pasteurized process cheese food is prepared in a manner similar to that of pasteurized process cheese. However, it has a much lower fat content—generally about 23 percent. The moisture content is not more than about 44 percent. Pasteurized process cheese food generally may include the optional ingredients of pasteurized process cheese, as well as other optional ingredients, which may include additional dairy ingredients, such as milk, skim milk, buttermilk, anhydrous milkfat, cheese whey, skim milk cheese, and albumin. In addition, any of the foregoing from which part of the water has been removed can be used. The same emulsifying agents permitted in the manufacture of pasteurized process cheese can also be used in the manufacture of pasteurized process cheese food.

Pasteurized process cheese spread is prepared in a manner similar to pasteurized process cheese and pasteurized process cheese food, and may contain the optionally ingredients of pasteurized process cheese food. In addition, the use of gums is permitted in pasteurized process cheese spread. The gums that can be used include carob bean gum, gum karaya, gum tragacanth, guar gum, gelatin, sodium carboxymethyl cellulose, carrageenan, oat gum, sodium alginate, propylene glycol alginate and xanthum gum. The total weight of the gums cannot be more than about 0.8 percent of the weight of the finished pasteurized process cheese spread. The moisture content of pasteurized process cheese spread is generally about 44 to about 60 percent. The fat content of pasteurized process cheese spread is not less than about 20 percent. The same emulsifying agents described above can be used in the preparation of pasteurized process cheese spread.

It would be beneficial to provide a process cheese base prepared with edible powders as a substitute for some or all of the natural cheese normally used in the production of process cheese for several reasons. Unlike natural cheese, such powders have the advantage of an extended shelf life. Thus, unlike natural cheese, these powders can be purchased when supplies are high and prices are low, and then used over an extended period of time. Further, it is often cheaper to purchase such powders than natural cheese. However, most process cheese manufacturing plants are not equipped to process large quantities of powders. Modifying such plants to permit them to process large quantities of powders would be very expensive.

The process of the invention advantageously transforms milk powders into a mass that acts very similar to natural cheese in a relatively quick and easy manner. The mass may readily be prepared in process cheese manufacturing plants without significant modifications and used as a substitute for some or all of the natural cheese normally used in the manufacture of process cheese. Alternatively, the mass, which advantageously has the texture and consistency of natural cheese, may be combined with conventional flavors and consumed as a fresh cheese product.

DESCRIPTION OF THE RELATED ART

U.S. Pat. No. 3,920,857 describes a method for preparing a granular, free-flowing lecithin product wherein agglomerated non-fat dry milk or whey is blended with lecithin. Example 1 describes the use of a ribbon blender to blend agglomerated non-fat dry milk and heated lecithin.

U.S. Pat. No. 4,762,725 describes a method of making a nonaqueous, lipid-based, stable, flavored coating that is spreadable at room temperature. The coating is prepared by mixing vegetable oil, a bulking agent, a flavorant, and a lipid stabilizer at a temperature sufficiently elevated to provide the lipid component in a molten state, and cooling the mixture of ingredients to a temperature in the range of 70–100° F.

U.S. Pat. No. 5,215,778 describes low calorie, substantially fat-free process cheese products that are stated to have textural and organoleptic mouthfeel characteristics simulating conventional process cheese products. This patent describes the addition of a gum in dry form with other powdered components, such as powdered skim milk and powdered dried whey solids, to a ground skim cheese and a highly viscous microreticulated microcrystalline cellulose aqueous dispersion under conditions of shear, such as in a ribbon blender.

U.S. Pat. No. 5,433,962 describes a flavored instant coffee product, and a process for making such product. Several of the examples describe the use of a ribbon blender to blend various ingredients, such as non-dairy creamer and sugar.

U.S. Pat. No. 5,709,900 describes a low-fat natural cheese that is prepared from skim milk or skim milk cheese and a gel-forming fat mimetic to provide a non-fat cheese product which is stated to be similar in body and texture to natural cheese. In one embodiment of a method described for making the cheese product, a gel-forming fat mimetic is added to skim milk to provide a cheese substrate. The cheese substrate is then subjected to a cheese make procedure to provide a cheese curd. The cheese curd is then cured to provide a low-fat skim milk cheese. The skim milk cheese is comminuted and heated to a temperature of from about 140° F. to about 180° F. for a period of time sufficient to provide a homogeneous cheese mass. The cheese mass is then packaged. In another embodiment, a mixture of skim milk cheese, a gel-forming fat mimetic and an emulsifying salt is provided. The mixture is heated to a temperature of from about 140° F. to about 180° F. The mixture is held at the elevated temperature for a period of from about 0.5 minutes to about 8 minutes to provide a homogeneous cheese mass, which is then packaged.

U.S. Pat. No. 5,851,577 describes a process cheese product containing natural cheese, a dry component selected from the group consisting of whey protein concentrate, non-fat milk solids, and mixtures thereof, and yogurt. This patent also describes a method for making the process cheese product. One or more types of natural cheese are ground to provide a particulate cheese. The particulate cheese is mixed with the dry component in a blender to provide a cheese mixture. The mixture is transferred to a cooker, and the mixture is heated to a first predetermined temperature. Yogurt is added to the heated mixture to provide a process cheese product. Heating of the product is continued to a second predetermined temperature. The product is then cooled and packaged.

European Patent Publication EP099/7073A2 describes a process for preparing a liquid, pumpable fresh cheese.

SUMMARY OF THE INVENTION

The present invention provides a method for preparing cheese products and process cheese bases for use in the production of process cheeses. The method generally comprises mixing one or more concentrated powders derived from milk with sodium chloride, milk fat, water, and, optionally, an edible acid and/or a preservative for a period of time sufficient to produce a well-mixed product, wherein the concentrated powders are present in an amount ranging from about 25 to about 60 percent of the total weight of the cheese product or process cheese base, wherein the sodium chloride is present in an amount ranging from about 0.5 to about 4.0 percent of the total weight of the cheese product or process cheese base, wherein the milk fat is present in an amount ranging from about 9 to about 38 percent of the total weight of the cheese product or process cheese base, and is at a temperature ranging from about 80° F. to about 140° F., wherein the edible acid is present in an amount ranging from about 0 to about 2.0 percent of the total weight of the cheese product or process cheese base, wherein the preservative is present in an amount ranging from about 0 to about 0.2 percent of the total weight of the cheese product or process cheese base, and wherein the water is present at a weight percent of the total weight of the cheese product or process cheese base which is sufficient to form the cheese product or process cheese base, and to bring the weight percent of the cheese product or process cheese base to one hundred percent. The use of the edible acid is optional when preparing process cheese bases, but is required when preparing cheese products, according to the method of the invention. The resulting mixture is cooled for a time and at a temperature that is sufficient to allow the mixture to form a solid matrix, which can then be consumed, or employed as an ingredient in natural cheese. Such a process cheese base could be ground and then used in the manufacture of process cheese in a process cheese manufacturing plant. The present invention also provides cheese products and process cheese bases prepared according to the above method, and process cheeses produced with the process cheese bases of the invention.

DETAILED DESCRIPTION OF THE PREFERRED EMBODIMENTS

Figure 1:
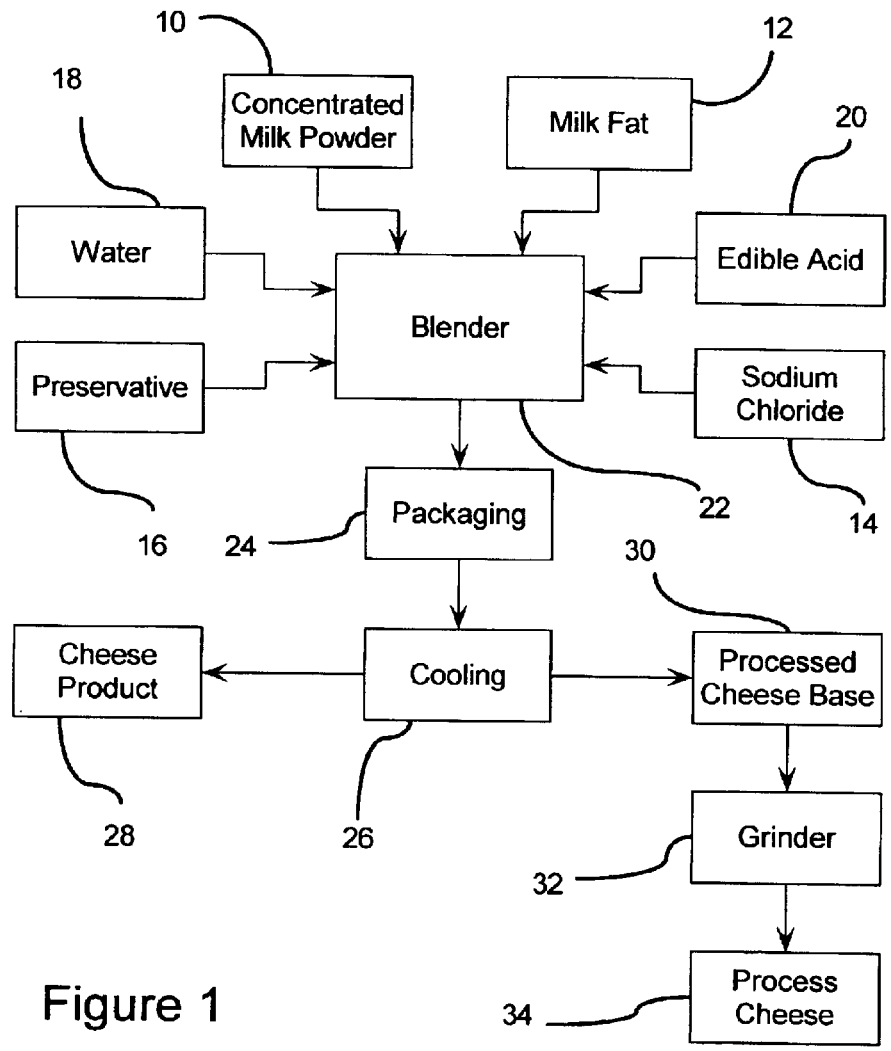
FIG. 1 is a schematic drawing that shows one embodiment of the process for preparing a cheese product or process cheese base according to the invention.

The present invention may be understood more readily by reference to the following detailed description of the preferred embodiments of the invention, drawing, and the example included therein.

Method of Production. In one aspect, the present invention provides a method for preparing a cheese product or a process cheese base that may be employed in the production of process cheese. The method uses the ingredients, the amounts thereof, and the steps described hereinbelow.

The method for preparing a cheese product or process cheese base of the invention generally comprises mixing one or more concentrated powders derived from milk with sodium chloride, milk fat, water, and, optionally, an edible acid and/or a preservative for a period of time sufficient to produce a well-mixed, homogeneous product, and cooling the resulting mixture for a time and at a temperature which is sufficient to allow the mixture to form a solid matrix. It is preferable, prior to the mixing of the ingredients, to add the powders and sodium chloride together first, followed by the optional ingredients, milk fat, and water. It is also preferable to add the milk fat to the other ingredients prior to the addition of the water (for ease of mixing). The solid matrix may be consumed as a cheese product, or may be employed as an additive to, or substitute for, some or all of the natural cheese in a process for producing process cheese. Such a process cheese base is preferably ground using convention cheese grinding systems for such use.

Concentrated Milk Powders. A wide variety of concentrated powders derived from milk (hereinafter "concentrated milk powders") can be employed in the process of the invention. These concentrated milk powders include non-fat dry milk (NFDM), whey powders, casein, and milk protein powders or concentrates. Preferred milk protein powders are commercially available under tradenames ALAPRO 4850 (MPC85), ALAPRO 4700 (MPC70), ALAPRO 4560 (MPC56), ALAPRO 4420 (MPC42), and ALAPRO 4424 from New Zealand Milk Products, Inc. (New Zealand), and MPC80, MPC56, and MPC42 from Murray Goulburn (Australia); mixtures can also be used if desired. These concentrated milk powders may also be prepared by conventional procedures known by those of skill in the art. The concentrated milk powders are generally characterized by the amount of milk protein that they contain. For example, MPC70 contains 70 percent of crude protein. Generally, commercial milk protein powders contain about 1 percent fat.

The concentrated milk powders employed in the process of the invention generally range from about 25 to about 60 percent of the total weight of the cheese product or process cheese base being produced, and preferably range from about 30 to about 55 percent.

Sodium Chloride. Sodium chloride (table salt) is employed in the process of the invention. It is preferred that a fine grade (small particles) sodium chloride be employed because it will dissolve more rapidly during the mixing of ingredients. The sodium chloride employed in the process of the invention generally ranges from about 0.5 to about 4.0 percent of the total weight of the cheese product or process cheese base being produced, and preferably ranges from about 1.5 to about 2.0 percent, with about 1.8 percent being most preferred.

Milk Fats. A wide variety of milk fats can be employed in the process of the invention. These milk fats include cream, dried sweet cream, anhydrous milk fat, concentrated milk fat, and mixtures thereof. Such milk fats are commercially available from sources known by those of skill in the art, such as, for example, Kraft Foods, Inc. (Northfield, Ill.), Land O'Lakes (Tulare, Calif.), Dairy Gold (Kilmallock, Ireland), New Zealand Milk Products, Inc. (Victoria, Australia), and Dairy Farmers of America (Dairy Farmer Coop. telephone number (888) 385-4711).

The milk fat employed in the process of the invention generally ranges from about 9 to about 38 percent of the total weight of the cheese product or process cheese base being produced, and preferably ranges from about 15 to about 36 percent.

The milk fat provides a thin continuous phase into which powder particles become embedded and form a matrix. In order to obtain a good fat distribution within the mixture of ingredients used to form a solid matrix, the milk fat should be heated to a temperature ranging from about 80° F. to about 140° F., and preferably to a temperature ranging from about 95° F. to about 105° F. If the milk fat is heated too high (above 140° F.), off flavors may result in the products. In addition, higher temperatures add to the heat load that needs to be removed during the cooling step of the process. If the milk fat is not heated enough, it will not melt and, thus, will not mix easily with the other ingredients.

Acids. Any edible acid may be used in the process of the invention, such as lactic acid, acetic acid, glucone-delta-lactone, and the like; lactic acid is generally preferred. The use of an acid is optional when, according to the method of the invention, process cheese bases are prepared, but is required when cheese products are prepared. In other words, for cheese products of this invention which are to be directly consumed (as opposed to being used to make other cheese product), an acid should be included in the formulation. The acid employed in the process of the invention generally ranges from about 0.5 to about 2.0 percent of the total weight of the cheese product being produced, and from about 0 to about 2.0 percent of the total weight of the process cheese base being produced, and preferably ranges from about 1.5 to about 1.8 percent, with about 1.7 percent being most preferred.

Preservatives. Preservatives, such as sorbic acid, propionic acid, natamycin, and the like, may optionally be employed in the process of present invention to inhibit the growth of mold on the cheese product or process cheese base being produced. The preservatives employed in the process of the invention generally ranges from about 0 to about 0.2 percent of the total weight of the cheese product or process cheese base being produced, and preferably ranges from about 0.15 to about 0.18 percent, with about 0.18 percent being most preferred.

Water. The amount of water employed in the process of the invention generally ranges from about 30 to about 75 percent of the total weight of the cheese product or process cheese base being produced, and preferably ranges from about 32 to about 34 percent, with about 33 percent being most preferred. The temperature of the water employed in the process of the invention generally should be about 32° F. to about 60° F., and preferably from about 50° F. to about 60° F., with about 55° F. being most preferred.

Other Optional Ingredients. It is contemplated that a wide variety of other edible natural or artificial flavors and ingredients may, optionally, be employed in the process of the invention. Such ingredients include any edible substance which, either alone, or in combination with other ingredients, imparts a desirable taste, color, and/or other benefit to the cheese product or process cheese base being manufactured. The amount and type of these ingredients that may be employed in the process of the invention depend upon the desired color and flavor of the final cheese product or process cheese base being produced.

Mixing of Ingredients. The concentrated milk powders, sodium chloride, milk fat, water, edible acid, preservatives, and other optional ingredients are generally mixed for a period of time, and at a temperature, sufficient to thoroughly mix the various ingredients. Generally, the ingredients will become thoroughly mixed during a time ranging from about 10 minutes to about 30 minutes. A mixing time ranging from about 10 minutes to about 20 minutes is preferred, with a mixing time of about 15 minutes being most preferred. The temperature at which the ingredients should be mixed generally ranges from about 75° F. to about 90° F., and preferably ranges from about 75° F. to about 85° F., with about 80° F. being most preferred.

The above ingredients may be mixed with any suitable mixing apparatus known by those of skill in the art. However, it is preferred that the ingredients be mixed with a ribbon blender.

Cooling Process. The mixture of ingredients described above should then be cooled for a time and at a temperature that is sufficient to allow the mixture to form a solid matrix that can be ground by a cheese grinding system in a process cheese or other manufacturing plant. The cooled matrix will generally be pale yellow in color, hard and difficult to cut with a knife, have a slightly greasy feel to the touch, and have a milky, creamy taste with a slightly grainy mouthfeel. Generally, the mixture should be cooled to a temperature ranging from about 35° F. to about 55° F. A temperature ranging from about 37° F. to about 43° F. is preferred, with a temperature of about 40° F. being most preferred. Rapid cooling of the mixture of ingredients provides a pathogen microbarrier for the resulting product. It is preferable that the mixture of ingredients be cooled to a temperature below about 55° F. in about 60 hours or less.

The mixture of ingredients may be cooled with any suitable cooling apparatus known by those of skill in the art for cooling food ingredients, for example, a cooled batch tank or refrigerated storage. However, it is preferred that the product that is discharged from the mixing apparatus be packaged first in any suitable packaging system, such as steel or plastic drums or corrugated material containers, and then cooled by transferring it into a rapid cooling tunnel for a precise temperature reduction.

The fat content of the cheese product or process cheese base generally ranges from about 10 to about 40 percent of the total weight of the cheese product or process cheese base, and preferably ranges from about 15 to about 36 percent. The solids content generally ranges from about 55 to about 70 percent of the total weight of the cheese product or process cheese base being produced, and preferably ranges from about 64 to about 66 percent, with about 65 percent being most preferred.

After the mixture of ingredients has been properly cooled, it is ready for consumption (if used as a cheese product) or grinding during the production of process cheese in a process cheese manufacturing plant (if used as a process cheese base).

Process cheese bases of the invention may then be manufactured into process cheese using conventional methodology and equipment known by those of skill in the art. The process cheese base preferably is used as a substitute for some or all of the natural cheese conventionally employed in the production of process cheeses, and has the compositional equivalence of natural cheese. For example, the process cheese base may be delivered in appropriate packaging containers, such as in 500 pound containers, to the cheese grinding system of a process cheese production plant (or of other plants that can use milk powders and milk fat), where the process cheese base may be employed as the raw material, and as a substitute for, or as an additive to, natural cheese, in an initial step of the production of process cheese. With the use of different optional color and flavor ingredients, and of different milk powders, any of the desired types of process cheese may be produced, such as Cheddar, Mozzarella, Edam, Gouda, Gruyere, Monterey Jack, Colby, Swiss, American, Longhorn, Limburger, and Muenster.

A more complete understanding of the process of the present invention may be understood by reference to the accompanying schematic drawing (FIG. 1), which depicts one embodiment of a process for preparing a cheese product or process cheese base in accordance with the present invention.

Referring to FIG. 1, concentrated milk powders 10, milk fat 12, sodium chloride 14, a preservative 16, water 18, and an edible acid 20 are blended together in a mixing step 22. The resulting mixture is packaged during a packaging step 24, cooled during a cooling step 26 to form a solid matrix. The solid matrix is either consumed as cheese product 28 or ground as process cheese base 30 in a grinding step 32 for conversion to, or use as a component of, a process cheese 34 in a process cheese manufacturing plant.

Cheese Products. In another aspect, the present invention provides cheese products prepared according to the method of the invention. In yet another aspect, the present invention provides process cheese bases prepared according to the method of the invention.

In a further aspect, the present invention provides process cheese prepared using the process cheese base as an additive to, or substitute for, natural cheese in the production of process cheese. The amount of process cheese base used to prepare process cheese generally ranges from about 5 to about 20 percent of the total weight of the process cheese, and depends upon the process cheese product being prepared.

The following example describes and illustrates the methods for the preparation of cheese products and process cheese bases within the present invention. This example is intended to be merely illustrative of the present invention, and not limiting thereof in either scope of spirit. Those of skill in the art will readily understand that variations of certain of the conditions and/or steps employed in the procedures described in the example can be used to prepare and test these cheese products and process cheese bases. All materials and equipment employed in the example, and generally employed to make and use the cheese products, process cheese bases, and process cheeses, of the present invention are commercially available from sources known by those of skill in the art. Unless indicated otherwise, all percentages are by weight.

EXAMPLE 1

Milk protein concentrate (20.4 lbs, 70 percent protein) and salt (0.6 lbs) was added to a ribbon mixer (American Process Systems, Gurnee, Ill.). Water (13.2 lbs) was added and mixed with the concentrate for about 3 minutes. Anhydrous milk fat (5.8 lbs) was added and mixing continued for an additional 3 minutes. To insure complete mixing, approximately 10 lbs of the blend was discharged from the bottom of the blender and added back through the top; blending continued for an additional 5 minutes. The temperature during mixing was about 84° F. The blend was discharged into a poly-lined steel bucket and stored at about 45° F. The resulting process cheese base could be ground and then used as a substitute for all or some of the natural cheese normally used to prepare process cheese.

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable. Throughout this application, various patents and Standards of Identity have been cited; these are hereby incorporated by reference herein in their entireties.

What is claimed is:

1. A method for preparing a cheese product comprising:
   (1) mixing one or more concentrated powders derived from milk with sodium chloride, milk fat, water, and, optionally, an edible acid and a preservative for a period of time sufficient to produce a mixed product, wherein the concentrated powders are present in an amount ranging from about 25 to about 60 percent, wherein the sodium chloride is present in an amount ranging from about 0.5 to about 4.0 percent, wherein the milk fat is present in an amount ranging from about 9 to about 38 percent, wherein the edible acid is present in an amount ranging from 0 to about 2.0 percent, wherein the preservative is present in an amount ranging from 0 to about 0.2 percent, wherein the water is present at a level sufficient to form the cheese product, wherein percentages are based on the total weight of the cheese product, and wherein the milk fat during mixing is at a temperature of about 80 to about 140° F.; and
   (2) cooling the mixed product for a time and at a temperature which is sufficient to allow the mixed product to form a solid matrix, wherein the solid matrix is the cheese product;
   wherein the cheese product has the texture and consistency of fresh cheese.

2. The method of claim 1, wherein the period of time for mixing is about 10 to about 30 minutes.

3. The method of claim 2, wherein the mixed product is cooled to a temperature ranging from about 35 to about 55° F.

4. A method for preparing a process cheese base comprising:
   (1) mixing one or more concentrated powders derived from milk with sodium chloride, milk fat, water, and, optionally, an edible acid and a preservative for a period of time sufficient to produce a mixed product, wherein the concentrated powders are present in an amount ranging from about 25 to about 60 percent, wherein the sodium chloride is present in an amount ranging from about 0.5 to about 4.0 percent, wherein the milk fat is present in an amount ranging from about 9 to about 38 percent, wherein the edible acid is present in an amount ranging from 0 to about 2.0 percent, wherein the preservative is present in an amount ranging from 0 to about 0.2 percent, wherein the water is present at a level sufficient to form the process cheese base, wherein percentages are based on the total weight of the process cheese base, and wherein the milk fat during mixing is at a temperature of about 80 to about 140° F.; and
   (2) cooling the mixed product for a time and at a temperature which is sufficient to allow the mixed product to form a solid matrix that can be ground by a cheese grinding system, wherein the solid matrix is the process cheese base;
   wherein the process cheese base may be employed as a substitute for some or all of the natural cheese in a process for producing process cheese.

5. The method of claim 4, wherein the period of time for mixing is about 10 to about 30 minutes.

6. The method of claim 5, wherein the mixed product is cooled to a temperature ranging from about 35 to about 55° F.

7. The method of claim 6, wherein the concentrated milk powders range from about 30 to about 55 percent of the total weight of the process cheese base.

8. The method of claim 7, wherein the sodium chloride ranges from about 1.5 to about 2.0 percent.

9. The method of claim 8, wherein the milk fat ranges from about 15 to about 36 percent.

10. The method of claim 9, wherein the water ranges from about 32 to about 34 percent.

11. The method of claim 10, wherein the concentrated milk powders are non-fat dry milk, whey powders, casein, or milk protein powders.

12. The method of claim 11, wherein the milk fat is cream, dried sweet cream, anhydrous milk fat, concentrated milk fat, or mixtures thereof.

13. The method of claim 12, wherein the edible acid ranges from about 0.5 to about 2.0 percent.

14. The method of claim 13, wherein the edible acid is lactic acid.

15. The method of claim 14, wherein the preservative ranges from about 0.15 to about 0.18 percent.

16. The method of claim 15, wherein the preservative is sorbic acid.

17. The method of claim 16, wherein the process cheese base has a fat content ranging from about 10 to about 40 percent.

* * * * *

UNITED STATES PATENT AND TRADEMARK OFFICE
CERTIFICATE OF CORRECTION

PATENT NO. : 6,773,740 B2
DATED : August 10, 2004
INVENTOR(S) : Michael A. Hyde et al.

It is certified that error appears in the above-identified patent and that said Letters Patent is hereby corrected as shown below:

Title page,
Item [22], Filed, delete "Dec. 12, 2000" and insert -- Dec. 14, 2000 --.

Signed and Sealed this

First Day of February, 2005

JON W. DUDAS
*Director of the United States Patent and Trademark Office*